US007762488B2

(12) United States Patent
Wu

(10) Patent No.: US 7,762,488 B2
(45) Date of Patent: Jul. 27, 2010

(54) ELECTRIC PEPPER CAN

(75) Inventor: Hua-Te Wu, Tainan (TW)

(73) Assignee: Yienn Lih Enterprise Co., Ltd., Tainan (TW)

( * ) Notice: Subject to any disclaimer, the term of this patent is extended or adjusted under 35 U.S.C. 154(b) by 0 days.

(21) Appl. No.: 12/289,556

(22) Filed: Oct. 30, 2008

(65) Prior Publication Data

US 2010/0108793 A1    May 6, 2010

(51) Int. Cl.
*A47J 42/06* (2006.01)
(52) U.S. Cl. .................................................. 241/169.1
(58) Field of Classification Search ................. 241/168, 241/169.1
See application file for complete search history.

(56) References Cited

U.S. PATENT DOCUMENTS 6,830,205 B2 * 12/2004 Wang ...................... 241/169.1
7,077,347 B1 * 7/2006 Wang ...................... 241/169.1
7,380,737 B2 * 6/2008 Wang ...................... 241/169.1
7,604,189 B2 * 10/2009 Wang ...................... 241/169.1
2003/0052207 A1 * 3/2003 Wu ......................... 241/169.1

* cited by examiner

*Primary Examiner*—Faye Francis
(74) *Attorney, Agent, or Firm*—Rosenberg, Klein & Lee

(57) ABSTRACT

A pepper can includes a grinding mechanism, a rotary driving unit, and a controlling unit to make the rotary driving unit switch between its on and off states; the controlling unit includes two magnetic electricity-conducting pieces, which are electrically connected to the driving unit, and each have an elastic portion; the controlling unit includes a sealing sleeve positioned around the elastic portions, and a magnetic component capable of sliding close to the sealing sleeve; when the pepper can is in an in-use state, the magnetic component will make the elastic portions get into contact with each other owing to magnetic attraction, thus turning on the driving unit for the driving unit to drive the grinding unit to grind pepper; the elastic portions are airtightly wrapped in the sealing sleeve, and therefore can't oxidize or have dust accumulating thereon, preventing the risk of poor electrical contact existing between the elastic portions.

9 Claims, 5 Drawing Sheets

US 7,762,488 B2

ELECTRIC PEPPER CAN

BACKGROUND OF THE INVENTION

1. Field of the Invention

The present invention relates to a pepper can, more particularly an electric pepper can for grinding and dispensing pepper.

2. Brief Description of the Prior Art

Pepper is widely used as a condiment. Pepper corns are usually reserved in pepper cans with grinding function, which can be used to grind pepper corns and dispense the ground pepper. U.S. Pat. No. 7,077,347 and U.S. Pat. No. 6,830,205 taught an electric pepper can structure, which includes a can body, a grinding unit, and a motor mechanism for driving the grinding unit to grind pepper.

The above-mentioned electric pepper cans will automatically switch to its on state to grind pepper as soon as they are held upright with their upper ends facing upwards. And, they will automatically switch to its off state as soon as they are turned upside down. More detailedly, such an electric pepper can includes a can body, a motor, a grinding unit, a power mechanism, a sliding electricity-conducting piece, and two electricity-conducting elements, which are usually off each other, and connected in series with the power mechanism and the motor respectively; when the upper end of the electric pepper can faces upwards, the electricity-conducting piece will slide to such a position as to make the electricity-conducting elements electrically connected; thus, the motor will be powered by the power mechanism to drive the grinding unit to grind pepper; when the pepper can is turned upside down, the electricity-conducting piece will be away from the electricity-conducting elements, and in turn the motor is turned off.

The electric pepper can has the following drawbacks: First, the electricity-conducting piece and elements are exposed to the air without any protective means; they are prone to oxidize and have dust accumulating thereon, thus reducing in their conductivity after having been used a length of time. Consequently, the grinding unit can't grind pepper smoothly. Secondly, the pepper can further comprise a chief switch, which is installed on an upper cover on the can body; when the upper cover is turned so as to change the chief switch into its on state, the electric-conducting elements will be connected to a battery set of the power mechanism; when the upper cover is turned to change the chief switch into its off state, the electric-conducting elements will be apart from the battery set. Therefore, the electric pepper can has many components, and relatively high manufacturing cost.

SUMMARY OF THE INVENTION

It is a main object of the present invention to provide an improvement on an electric pepper can, which is convenient to use, and whose switch can't easily break down.

It is another object of the present invention to provide an improvement on an electric pepper can whose power switch can be easily fitted in position.

An electric pepper can in accordance with an embodiment of the present invention includes a shell, a grinding unit, a rotary driving unit, and a controlling unit. The shell has a holding space to hold pepper, and has a dispensing outlet on a lower end. The grinding unit is installed in the shell, and can be driven to grind pepper into granules and make the pepper granules fall out through the dispensing outlet of the shell. The rotary driving unit is installed in the shell, and it will drive the grinding unit to grind pepper when activated. The controlling unit is used to make the rotary driving unit switch between its on and off states, and includes two magnetic electricity-conducting pieces electrically connected to the rotary driving unit; the electricity-conducting pieces each has an elastic portion, and the elastic portions are normally off each other; a sealing sleeve is positioned around the elastic portions while a magnetic component is positioned next to and movable close to or away from the sealing sleeve.

When the dispensing outlet faces downwards, the magnetic component will be close to the sleeve, and make the elastic portions of the electricity-conducting pieces of the controlling unit get into contact owing to magnetic attraction; thus, the rotary driving unit is turned on and starts driving the grinding unit to grind pepper. When the dispensing outlet faces upwards, the magnetic component will be away from the sealing sleeve, incapable of making the electricity-conducting pieces get into contact with each other; thus, the rotary driving unit is turned off, and the grinding unit won't work.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
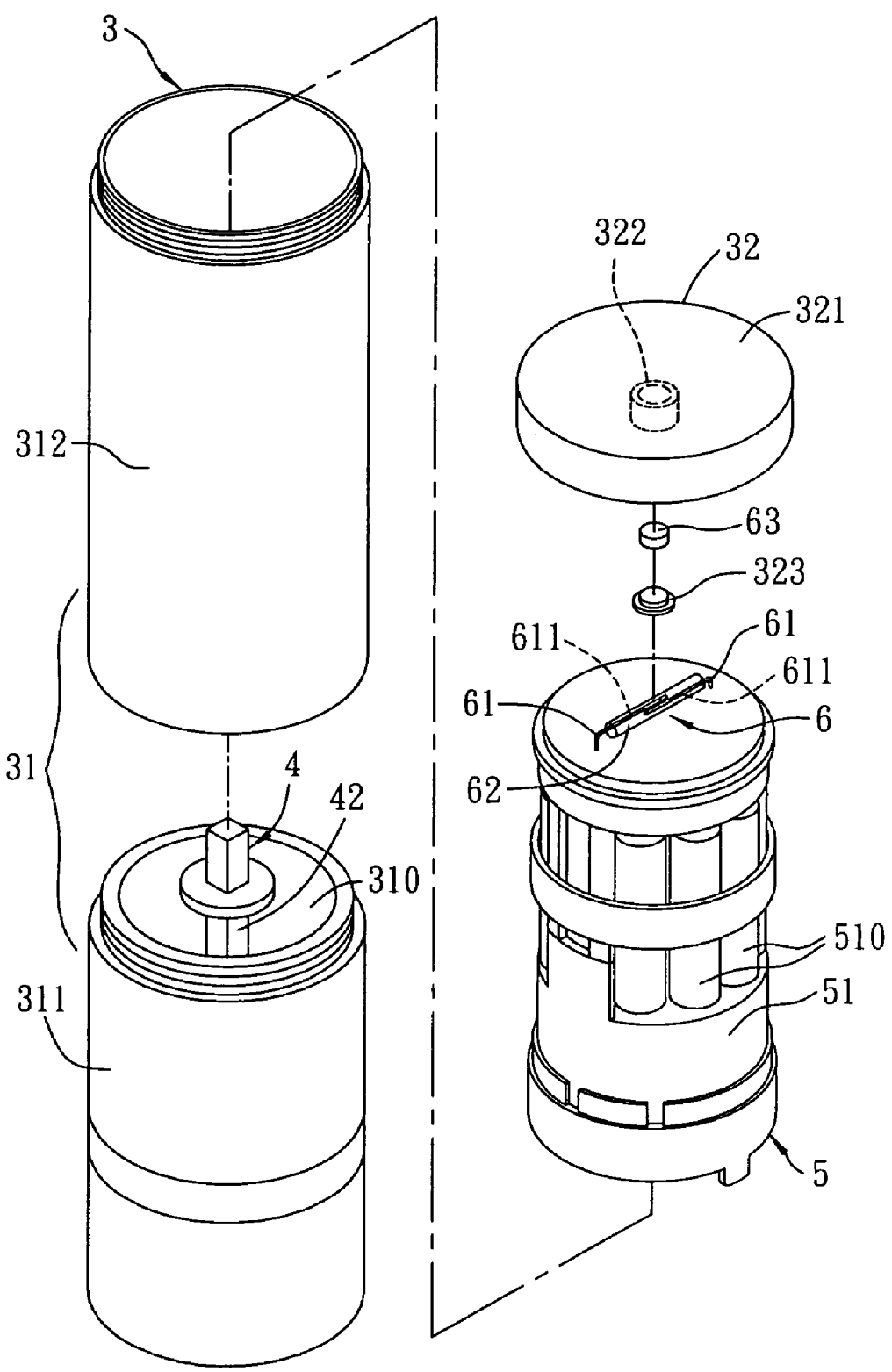
FIG. 1 is an exploded perspective view of the preferred embodiment of an electric pepper can of the present invention.
Figure 2:
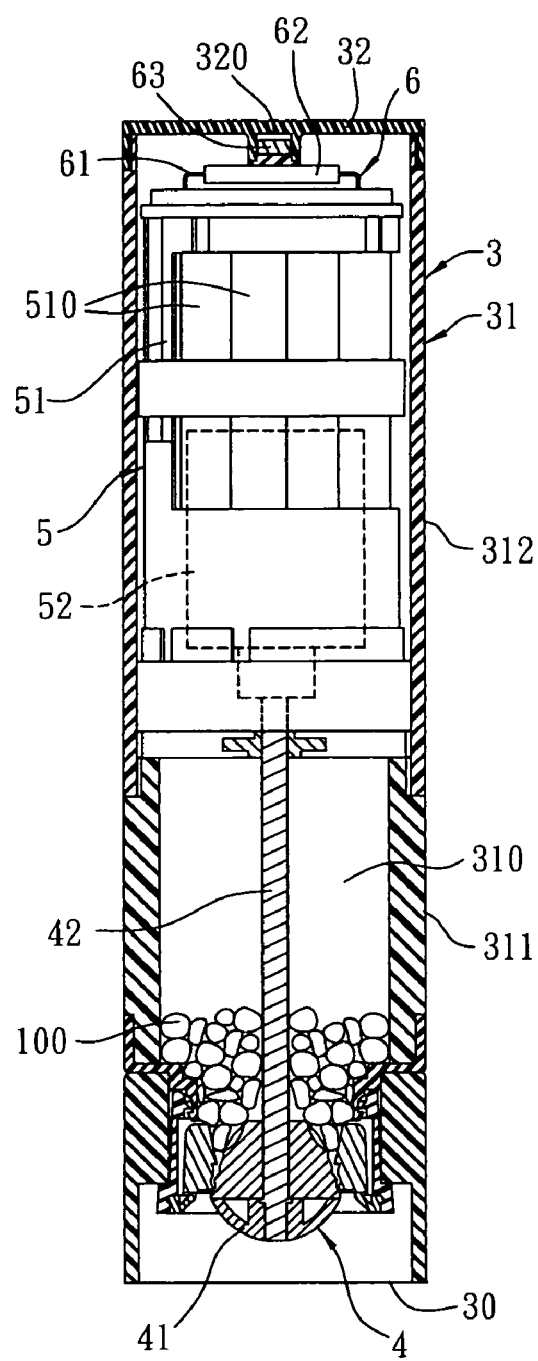
FIG. 2 is a lateral sectional view of the electric pepper can of FIG. 1, taken when the pepper can is in use.

Shown in FIGS. 1 and 2 is a preferred embodiment of an electric pepper can of the present invention, which is used to grind pepper corns 100 into pepper granules, and which can change from an in-use state to a not-in-use one. The electric pepper can includes an upright hollow shell 3, a grinding unit 4, a rotary driving unit 5, and a controlling unit 6. The grinding unit 4 is fixedly installed in a lower half part of the shell 3. The rotary driving unit 5 is fixedly installed in an upper half part of the shell 3, and can be activated to drive the grinding unit 4 to grind pepper. The controlling unit 6 is installed in the shell 3 to control the rotary driving unit 5.

The upright hollow shell 3 has a lower dispensing outlet 30, and is consists of a hollow tubular can body 1, an upper cover 32 joined on an upper end of the can body 31 so as to cover an upper opening of the can body 31. The can body 31 consists of a lower hollow part 311, and an upper hollow part 312; the lower hollow part 311 of the can body 31 has a holding space 310 to contain pepper; the upper hollow part 312 is joined on an upper end of the lower hollow part 311 in a detachable manner. The above-mentioned dispensing outlet 30 is formed on a lower end of the lower part 311 of the can body 31, and communicates with the holding space 310. The upper cover 32 includes a cover body 321, which closes the upper opening of the upper part 312 of the can body 31. The upper cover 32 includes an annular protrusion 322, which sticking downwards from a middle of a lower side of the cover body 321. The upper cover 32 further includes a blocking plate 323, which is joined on a lower end of the annular protrusion 322 to cover a lower opening of the annular protrusion 322, and which can be separated from the annular protrusion 322. The cover body 321, the annular protrusion 322 and the blocking plate 323 together define a room 320.

The grinding unit 4 includes a grinding mechanism 41, and a transmission shaft 42; the grinding mechanism 41 is fixedly positioned in a lower half portion of the lower part 311 of the can body 31 while the transmission shaft 42 is joined to the grinding mechanism 41, and sticks upwards through the holding space 310. The grinding mechanism 41 can prevent pepper 100 contained in the holding space 310 from being directly exposed through the dispensing outlet 30. When the rotary driving unit 5 is activated, the transmission shaft 42 and the grinding mechanism 41 will be rotated relative to the lower part 311 of the can body 31, and in turn pepper 100 contained in the holding space 310 will be conveyed downwards and ground. Consequently, pepper granules are moved out of the shell 3 through the dispensing outlet 30.

The rotary driving unit 5 includes a power mechanism 51, which is joined in the upper part 312 of the can body 31 to close the upper opening of the holding space 310. Several batteries 510 are joined in the power mechanism 51. The rotary driving unit 5 further includes a motor 52, which is joined in and connected in series with the power mechanism 51 so that power can be supplied from the batteries 510 to the motor 51. The motor 52 is further connected to the transmission shaft 42; thus, the grinding mechanism 41 will start rotating to grind pepper 100 when the rotary driving unit 5 is activated.

Figure 3:
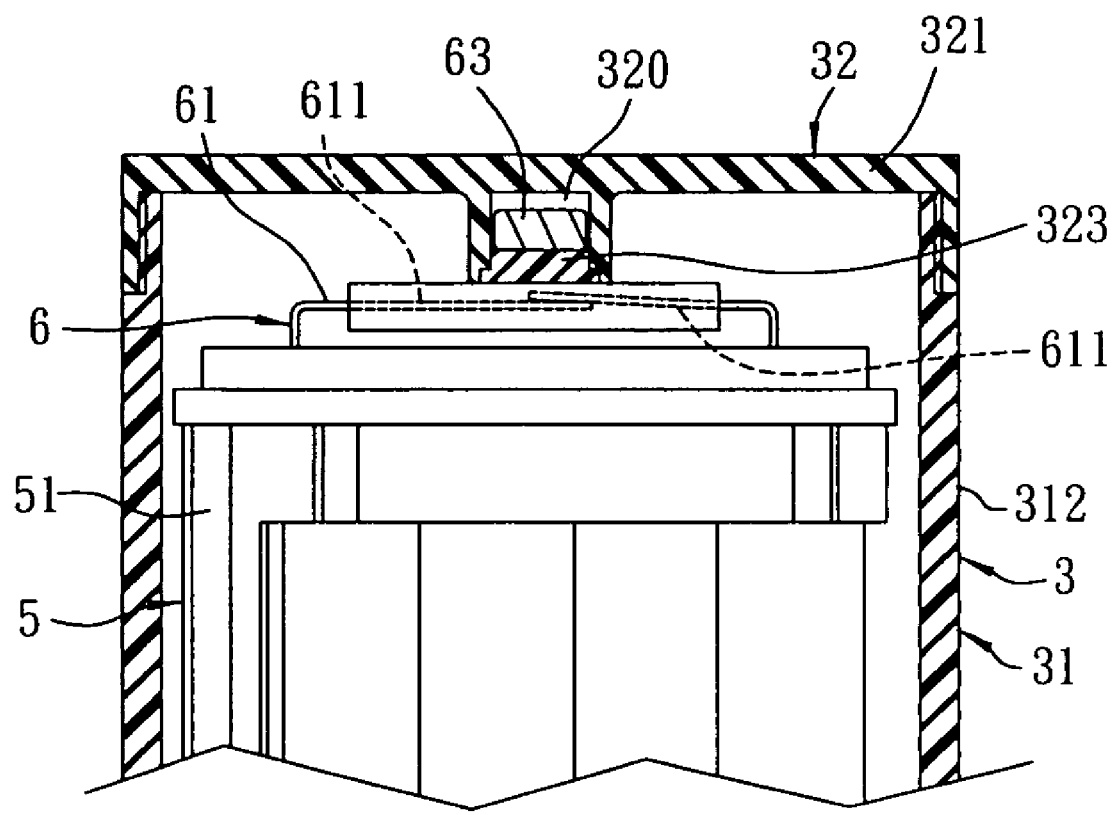
FIG. 3 is a partial enlarged view of FIG. 2, with the controlling unit being in such a state that the pepper can is turned on, FIG. 4 is an partial lateral sectional view of the preferred embodiment, with the controlling unit being such a state that the pepper can is turned off.

Referring to FIGS. 1 to 3, the controlling unit 6 includes two magnetic electricity-conducting pieces 61, which stick out through an upper side of the power mechanism 51, and which are connected in series with the power mechanism 51 and the motor 52 respectively. The controlling unit 6 further includes a sealing sleeve 62, and a magnetic component 63; the sealing sleeve 62 is positioned around the electricity-conducting pieces 61 in an airtight manner; the magnetic component 63 is confined in the room 320 of the upper cover 32, and can attract the electricity-conducting pieces 61.

The electricity-conducting pieces 61 each have a horizontally extending elastic portion 611, and the elastic portions 611 are positioned one above the other a distance apart; thus, the elastic portions 611 can be attracted to each other to come into contact if they are subjected to a proper magnetic force; when the elastic portions 611 contact each other, the electricity-conducting pieces 61, the power mechanism 51 and the motor 52 together comprise a closed circuit, and in turn the motor 52 is powered to rotate with the power supplied from the power mechanism 51. The sealing sleeve 62 is positioned around the elastic portions 611 of the electricity-conducting pieces 61.

The electricity-conducting pieces 61 are in the shape of a long and narrow strip, and are made of electricity-conductive metal capable of being attracted with magnetic force. The sealing sleeve 62 doesn't contain air therein, thus preventing the elastic portions 611 from being oxidized. The magnetic component 63 can be an ordinary magnet or other magnetic device.

Figure 5:
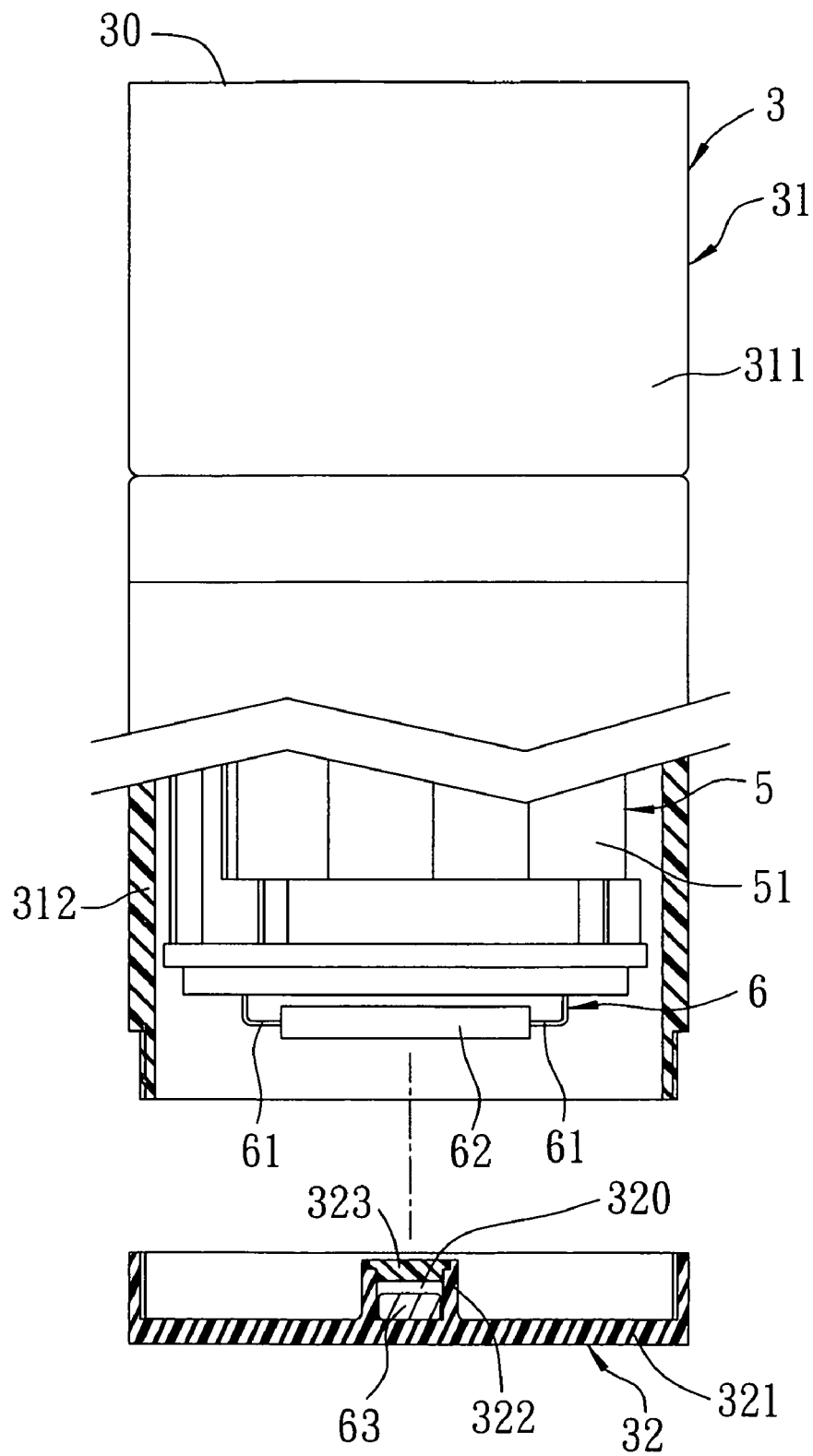
FIG. 5 is a lateral sectional view of the present invention, taken when the electric pepper can isn't in use and the cover is separated from the can body.

Referring to FIG. 5, pepper is put in the holding space 310 of the lower part 311 of the can body 31, and next the upper part 312 of the can body 31 is joined on the upper end of the lower part 311 so that the rotary shaft of the motor 52 is joined to the transmission shaft 42, and the power mechanism 51 closes the holding space 310. Next, the can body 31 is positioned upside down, with the dispensing outlet 30 facing upwards. And, the upper cover 32 is joined on the upper part 312 of the can body 31; thus, the sealing sleeve 62 will be propped against the outer side of the blocking plate 323 of the upper cover 32.

Figure 4:
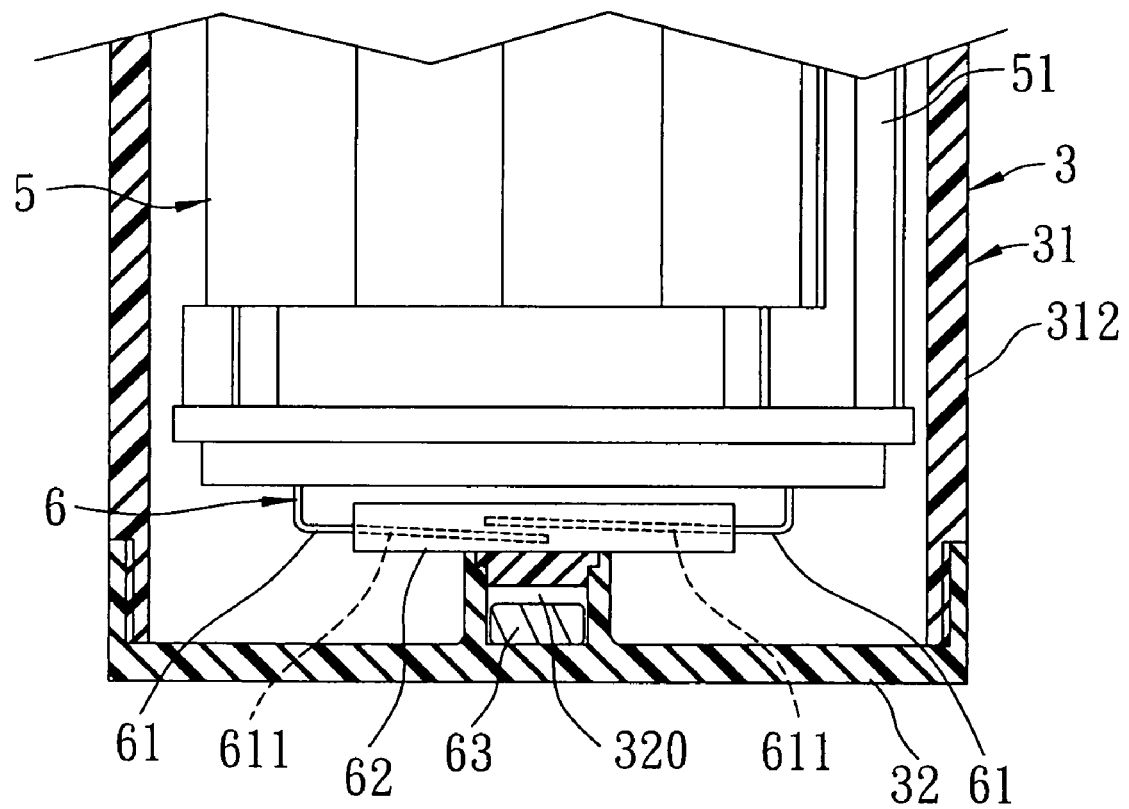

Shown in FIG. 4 is the electric pepper can of the invention in a not-in-use state, wherein the dispensing outlet 30 is facing upwards, and the magnetic component 63 of the controlling unit 6 is resting on the cover body 321 of the upper cover 32, apart from the electricity-conducting pieces 61 and incapable of making the elastic portions 611 of the electricity-conducting pieces 61 have such a mutual attractive force as to get into contact with each other. Therefore, the electricity-conducting pieces 61 can't make the power mechanism 51 and the motor 52 electrically connected, and the motor 52 and the grinding mechanism 41 can't work.

Shown in FIGS. 2 and 3 is the electric pepper can in an in-use state, wherein the dispensing outlet 30 faces downwards, and pepper 100 contained in the holding space 310 falls onto the grinding mechanism 41. At the same time, the magnetic component 63 will slide to a lower portion of the room 320 to rest on the blocking plate 323, relatively close to the elastic portions 611 of the electricity-conducting pieces 61. Thus, the magnetic force of the magnetic component 63 makes the elastic portions 611 attract each other to come into contact. Consequently, referring to FIG. 3, the power mechanism 51 and the motor 52 together comprise a closed circuit, and in turn the motor 52 is powered to rotate with the power supplied from the power mechanism 51, and pepper 100 is ground with the grinding mechanism 41; ground pepper will fall through the dispensing outlet 30 of the shell 3.

The electric pepper can will be automatically turned off as soon as it is turned upside down with the dispensing outlet 30 facing upwards.

Moreover, if the upper cover 32 is separated from the can body 31, as shown in FIG. 5, the electric pepper can won't be able to be activated to grind pepper no matter what position it is held in; when the upper cover 32 is apart from the can body 31, the magnetic component 63 can no longer apply magnetic force to the electricity-conducting pieces 61, and the electricity-conducting pieces 61 can't get into contact.

The sealing sleeve 62 of the controlling unit 6 is positioned around the elastic portions 611 of the electricity-conducting pieces 61 in an airtight manner, and all air is drawn out of the sealing sleeve 62; thus, the elastic portions 611 are prevented from oxidizing. The sealing sleeve 62 can be filled with inert gas instead of drawing air out of the sealing sleeve 62. Furthermore, even if the sealing sleeve 62 is positioned around the elastic portions 611 only in a virtually airtight manner instead of an absolutely airtight manner, the elastic portions 611 will still be effectively isolated from the atmosphere, thus prevented from oxidizing.

The controlling unit 6 can be positioned in other positions besides being installed in the room 320 of the upper cover 32; the controlling unit 6 should be installed in such a position that magnetic component 63 can make the elastic portions 611 of the electricity-conducting pieces 61 attract each other to get into contact when the pepper can is in the in-use position. For example, the controlling unit 6 can be positioned between the power mechanism 51 and the can body 31 instead.

From the above description, it can be seen that the present invention has the following advantages: First, the elastic portions of the electricity-conducting pieces are virtually airtightly wrapped in the sealing sleeve, and therefore can't oxidize or have dust accumulating thereon, preventing the risk of poor electrical contact existing between the elastic portions to hinder the grinding unit from working properly; the electric pepper can is relatively convenient to use. Secondly, the electric pepper can is incapable of being turned on after the upper cover is separated from the can body. In other words, the upper cover can serve as a chief switch, and there is no need for other switches on the present electric pepper can; the electric pepper can has a relatively uncomplicated structure and is easy to assemble and manufacture.

What is claimed is:

1. An electric pepper can, comprising
   (a) a hollow shell for holding pepper, the shell having a dispensing outlet;
   (b) a grinding unit installed in the shell, the grinding unit being driven to grind pepper into pepper granules and make the pepper granules fall out through the dispensing outlet of the shell;
   (c) a rotary driving unit installed in the shell and coupled to the grinding unit for driving the grinding unit to grind pepper when activated; and
   (d) a controlling unit, the controlling unit including:
      two magnetic electricity-conducting pieces electrically coupled to the rotary driving unit, the electricity-conducting pieces each having an elastic portion, the elastic portions being disposed in spaced relationship one from the other;
      a hollow sealing sleeve positioned around the elastic portions of the magnetic electricity-conducting pieces; and
      a magnetic component positioned in correspondence with the sealing sleeve and being movable relative thereto responsive to an orientation of the shell, the magnetic component producing a magnetic force to attract the electricity-conducting pieces when positioned proximate to the sealing sleeve;
      whereby the electric pepper can has an in-use state and a not-in-use state, the in-use state being initiated when the shell is oriented with the dispensing outlet facing downwardly, the magnetic component being displaced responsive thereto to a position proximate to the sealing sleeve and thereby magnetically attract the elastic portions of the electricity-conducting pieces into contact with each other owing to magnetic attraction, the contact between the elastic portions of the electricity-conducting pieces turning on the rotary driving unit to drive the grinding unit for grinding pepper;
      the not-in-use state being initiated when the shell is oriented with the dispensing outlet facing upwardly, the magnetic component being displaced responsive thereto away from being proximate to the sealing sleeve, whereat the magnetic force of the magnetic component is incapable of attracting the elastic portions of the electricity-conducting pieces into contact with each other and thereby off the rotary driving unit.

2. The electric pepper can as claimed in claim 1, wherein the shell includes:
   a longitudinally extended hollow tubular can body, the grinding unit being positioned in the can body, and the dispensing outlet being formed on a lower end of the can body; and
   an upper cover detachably joined to the can body to cover an upper opening thereof, the upper cover having a room formed therein, the magnetic component being retained in the room and being longitudinally displaceable responsive to the orientation of the shell;
   the rotary driving unit being positioned in an upper half portion of the can body, the elastic portions of the electricity-conducting pieces being positioned proximate to a lower side of the room of the upper cover.

3. The electric pepper can as claimed in claim 2, wherein the can body includes:
   a lower hollow part having a holding space to contain pepper, the dispensing outlet being formed on a lower end of the lower part of the can body to communicate with the holding space; and
   an upper hollow part detachably joined to an upper end of the lower hollow part;
   the grinding unit being installed in the lower part of the can body to prevent pepper from falling out through the dispensing outlet;
   the rotary driving unit being joined in the upper part of the can body to close an upper opening of the holding space, the upper cover closing an upper end of the upper part of the can body.

4. The electric pepper can as claimed in claim 3, wherein the grinding unit includes:
   a grinding mechanism positioned in a lower half portion of the lower part of the can body for grinding pepper; and
   a transmission shaft extending longitudinally from the grinding mechanism and passing through the holding space to drive the grinding mechanism;
   the rotary driving unit includes:
      a power mechanism joined in the upper part of the can body to close the upper opening of the holding space and output electric power; and
      a motor connected to the transmission shaft, the motor being driven by electric power output from the power mechanism to drive the grinding mechanism.

5. The electric pepper can as claimed in claim 2, wherein the sealing sleeve is positioned around the elastic portions of the electricity-conducting pieces in an airtight manner without air being contained therein.

6. The electric pepper can as claimed in claim 2, wherein the sealing sleeve is positioned around the elastic portions of the electricity-conducting pieces in an airtight manner with an inert gas being contained therein.

7. The electric pepper can as claimed in claim 1, wherein the magnetic component is a magnet.

8. The electric pepper can as claimed in claim 1, wherein the sealing sleeve is positioned around the elastic portions of the electricity-conducting pieces in an airtight manner without air being contained therein.

9. The electric pepper can as claimed in claim 1, wherein the sealing sleeve is positioned around the elastic portions of the electricity-conducting pieces in an airtight manner with an inert gas being contained therein.

* * * * *